United States Patent [19]

Davis et al.

[11] 4,403,828

[45] Sep. 13, 1983

[54] DAMAGE RESISTANT COATED LASER MIRROR

[75] Inventors: Jack W. Davis, East Hartford; Paul R. Blaszuk, Lebanon, both of Conn.

[73] Assignee: United Technologies Corporation, Hartford, Conn.

[21] Appl. No.: 269,197

[22] Filed: Jun. 1, 1981

[51] Int. Cl.³ .................................................. G02B 5/08
[52] U.S. Cl. .................................... 350/288; 350/310; 350/320
[58] Field of Search .............. 350/288, 310, 320, 582; 219/121 LC, 121 LD, 121 LQ; 427/162; 372/99

[56] References Cited

U.S. PATENT DOCUMENTS

| | | | |
|---|---|---|---|
| 2,697,130 | 12/1954 | Korbelak | 174/50.61 |
| 2,805,192 | 9/1957 | Brenner | 204/37 |
| 2,861,327 | 11/1958 | Bechtold et al. | 29/198 |
| 2,966,738 | 1/1961 | Bertossa | 29/196 |
| 3,609,589 | 9/1971 | Hufnagel | 331/94.5 |
| 4,025,997 | 5/1977 | Gernitis et al. | 428/621 |

OTHER PUBLICATIONS

Ledger, *Applied Optics,* vol. 18, No. 17, Sep. 1, 1979, pp. 2979-2989.

*Primary Examiner*—F. L. Evans
*Attorney, Agent, or Firm*—Harry J. Gwinnell

[57] ABSTRACT

A damage resistant laser mirror is disclosed comprising a copper substrate highly polished to an optical finish coated with a thin layer of molybdenum or tungsten. The composite has good reflecting properties, is damage-tough, and conducts heat well away from the reflective coating. The superior adhesion of the coating is demonstrated by the fact that severe staining can be removed from the surface of the mirror by abrasive polishing without removing or damaging the coating.

5 Claims, 4 Drawing Figures

DAMAGE RESISTANT COATED LASER MIRROR

DESCRIPTION

1. Technical Field

The field of art to which this invention pertains is composite optical elements, and specifically high energy radiation reflecting elements.

2. Background Art

While there is a myriad of art covering laser mirrors, because of the many peculiar physical property requirements of such mirrors in this environment, both a variety of materials and designs have been employed in attempts to optimize the particular properties necessary for such mirrors used in this particular environment. For example, a laser mirror in this environment must not only have the requisite reflective properties, but should be of relatively simple structure to permit ease of fabrication, both for time and cost purposes. And stability is of the utmost importance, both from the point of view of the fine resolution-type work environment the mirrors will be used in, and the inaccessibility of the environments which these mirrors will be used in. These stability properties include such things as damage resistance, low thermal expansion and high thermal conductivity. In order to accomplish these results, there are many types of and designs for laser mirrors such as highly polished metal blocks, graphite reinforced resin matrix composites, and low expansion glasses.

In the metal block area three types of mirrors which exist are: copper alone; molybdenum alone; and copper coated with gold or silver, generally with a nickel-containing basecoat. While the copper is a superior heat sink, it is not very damage resistant. And while the gold and silver on the copper improves the reflective quality of a copper mirror, as a coating the gold and silver are very fragile. And molybdenum, in addition to being very expensive, it not as good a heat sink as the copper and is much more difficult to polish to an optical quality surface. In fact, while molybdenum is generally preferred over copper in the laser mirror area, ease of polishing is one big advantage the copper has over molybdenum.

The newly developing field of industrial laser applications, e.g. the use of laser apparatus for welding, has complicated the already difficult design considerations of the laser mirror because of the rugged environments such uses provide. For example, in a welding operation, not only are there high temperatures to contend with, but metal spatter, grease, grime and other potential mirror staining elements present. This is quite a different environment than presented by the use of lasers in a laboratory or in outer space applications. And the conventionally used laser mirrors, such as the molybdenum blocks, are prohibitively expensive in this environment because of the great potential for mirror damage in this rugged use. For example, the damage resistance of molybdenum mirrors has been known, due to its very high melting temperature which prevents lower melting temperature metal droplets such as would be experienced in laser welding from destroying its surface. However, the molybdenum is very difficult to polish to an optical surface. And while conventional copper laser mirrors do not suffer from these problems, their advantageous properties, such as being able to take a high polish also lends to their lack of utility in this area because of their lower melting temperature and susceptibility to damage by metal droplets in the welding environment.

Accordingly, what is needed in the art is a damage resistant laser mirror which can be highly polished, be relatively inexpensive and yet be damage resistant in the rugged environment necessary for industrial laser applications.

DISCLOSURE OF INVENTION

The present invention is directed to a composite laser mirror comprising a highly polished copper surface of laser reflecting optical quality overcoated with a thin layer of refractory metal such as molybdenum or tungsten. The combination produces a laser mirror of high optical quality, relatively low expense, and high damage resistance.

Another aspect of the invention includes a method of restoring a refractory metal coated, copper based laser mirror whose laser reflectivity has been reduced or improved through staining or other defiling, by abrasively polishing. Surprisingly, in spite of rigorous stain-removal processes, the coating is retained and the mirror surface is capable of being polished to a high luster a plurality of times in spite of the coating thinness.

The foregoing, and other features and advantages of the present invention, will become more apparent from the following description and accompanying drawing.

BEST MODE FOR CARRYING OUT THE INVENTION

The primary utility for the mirrors according to the present invention is moderate to high power use in exceptionally hostile environments such as experienced in laser cutting and laser welding of metals.

The copper based substrate is preferably OFHC® copper (oxygen-free, high conductivity) and is typically square, rectangular or circular in shape although any design can be made. The copper substrate is highly polished to the point of being capable of being used as a laser mirror itself. This is important since the molybdenum or tungsten coating is applied so thin as to replicate the copper surface very closely.

The copper acts as a heat sink and has better thermal conductivity than e.g. a block of molybdenum would have in itself. Accordingly, there is potential for the combined copper substrate-molybdenum or tungsten coating to be useful for higher power laser reflectivity than the molybdenum would have itself.

The thickness of the applied molybdenum coating is very important for obtaining the advantages of the laser mirror according to the present invention. The coating must be thick enough to be opaque to the laser wavelength of interest, but thin enough to prevent columnar growth in the film applied. A preferred range of coating thickness is about 10,000 Å to about 2 microns.

The coating may be applied by any conventional metal depositing techniques such as conventional vapor deposition, electron beam sputtering, and RF sputtering.

Figure 1:
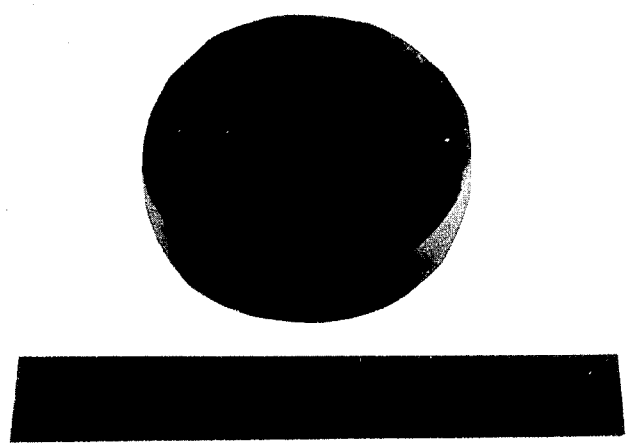
FIG. 1 shows a mirror according to the present invention stained with condensed stainless steel.
Figure 2:
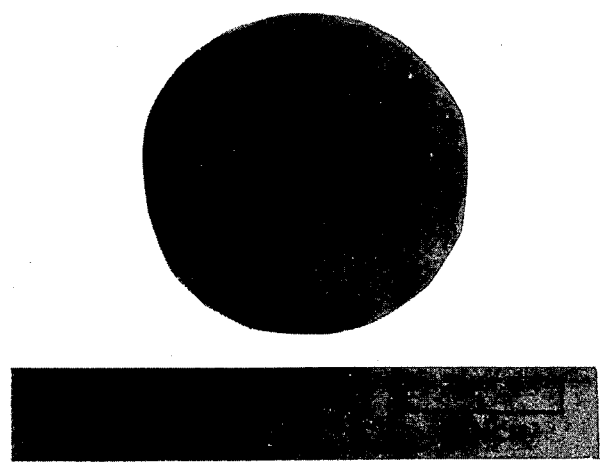
FIG. 2 shows the mirror of FIG. 1 after cleaning.
Figure 3:
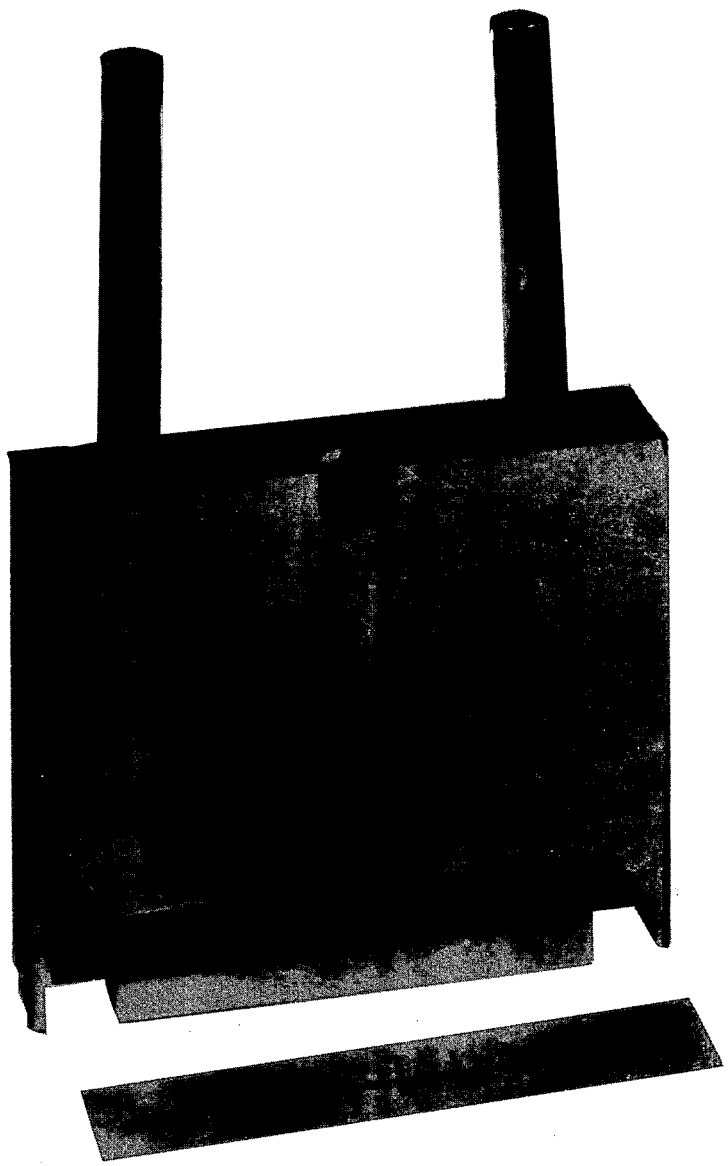
FIG. 3 shows a stained mirror according to the present invention after restoration.

A good indication of the damage resistance and toughness of the coating is demonstrated by another aspect of the present invention which includes a method of restoring a badly stained laser mirror according to the present invention. Reference is made to FIG. 1 which shows a coated laser mirror according to the present invention spattered with laser heated stainless steel. Simple cleaning with conventional soap and water solutions removed all of the spatter resulting in a mirror as shown in FIG. 2, virtually indistinguishable from the mirror prior to spattering. However, even more remarkable is a mirror which had been badly stained during industrial welding testing. The stains were the result of burnt debris falling on the mirror during the laser welding operation. Conventional soap and water washing did not remove the stains. Conventional abrasive polishing with Linde ® A and a felt pad was attempted, although it was felt that such treatment would definitely remove the thin molybdenum coating from the composite. Quite unexpectedly, not only were the stains removed, but the treated mirror was ready for reuse as demonstrated by FIG. 3. Linde A is a product of Union Carbide and is 99.9% aluminum oxide with an average particle size of 0.3 micron. The Linde A is used in suspension in water (e.g. up to about 50 gm/liter of water) and the mirror wet felt pad polished for about 1 hour or until the stains are removed.

By staining is meant any surface contamination of the mirror such that its reflectivity is reduced and includes such things as metal spatter from welding or a cutting process, dust, dirt or other foreign material "vapor" or otherwise deposited on the mirror surface during use. In fact, this represents another advantage of the coated laser mirrors according to the present invention (note FIGS. 2 and 3), in that they can be cleaned a number of times after use without affecting their damage resistant properties or loss of the coating. This is not the case with, for example, copper mirrors coated with gold or silver which can be cleaned, but only after mild staining, and they certainly cannot be repolished.

EXAMPLE

An 8-inch (20.3 cm) square copper substrate approximately 1 inch (2.54 cm) thick (a circular disk and rectangular substrates have also been used) with cooling grooves machined therein (note commonly assigned U.S. Pat. No. 3,637,296, the disclosure of which is incorporated by reference) is attached by silver braze to a copper cover member approximately 0.08 inch (0.20 cm) thick. The brazed composite is then machined after assembly, and ground to rough flatness starting with conventional coarse abrasives and ultimately polishing with a fine abrasive such as Linde A and a felt pad polisher. Generally, the abrasive polishing is done in three or more stages with increasingly fine grit. Although this Example is described for flat surface mirrors (note FIG. 4), it can be used for curved surfaced mirrors as well. After polishing, the mirror surface is cleaned with organic solvents and vacuum baked at 500° C. to dryness. While it is still hot, the mirror is sputter cleaned and molybdenum plated out (2 microns thick) on the mirror by conventional RF sputtering. The mirror is then allowed to cool down while maintaining the vacuum and is eventually brought to atmospheric pressure after cool-down. Without further polishing, the mirror is ready for use.

The mirrors according to the present invention could have less distortion than even a pure molybdenum mirror because of the high thermal conductivity of the copper, and therefore, have higher power capability. Mirrors of this type are specifically designed for moderate to high power use.

Figure 4:
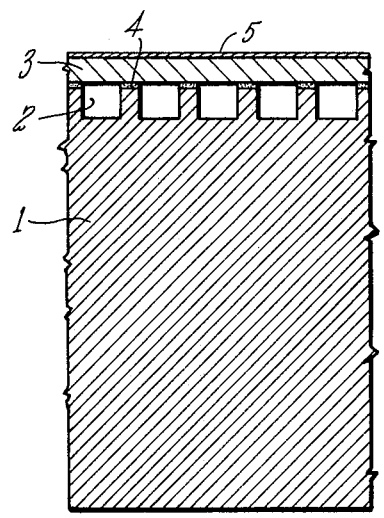
FIG. 4 shows schematically a coated laser mirror according to the present invention.

A typical mirror according to the present invention is shown in FIG. 4, where the copper substrate 1 has cooling grooves 2 approximately 0.08 inch (0.20 cm) square machined into the substrate. A copper cover member 3 is attached to the copper substrate with silver braze 4. The molybdenum coating 5 is deposited on the cover member.

While the invention has been described in terms of molybdenum or tungsten coatings, any refractory metal which has high reflectivity at the desired laser wavelength and very high melting temperatures may be coated on the copper substrate.

Accordingly, what has been found is the combination of a very thin coating of molybdenum or tungsten which provides toughness properties necessary in this art for the high temperature applications being utilized in conjunction with a highly polished copper block substrate which aids in heat transfer produces a superior mirror in this field.

Although this invention has been shown and described with respect to detailed embodiments thereof, it will be understood by those skilled in the art that various changes in form and detail thereof may be made without departing from the spirit and scope of the claimed invention.

We claim:

1. A damage resistant laser mirror comprising:
   a copper substrate polished to an optical, laser radiation reflective finish; and
   a thin film of molybdenum or tungsten coated on the copper substrate.

2. The mirror of claim 1 wherein the coating is about 10,000 Å to about 2 microns thick.

3. A method of restoring a stained laser mirror to laser reflecting quality comprising polishing the mirror in the presence of an abrasive to remove the staining, the improvement comprising
   polishing a molybdenum or tungsten coated copper mirror by such process without removing or damaging the coating, thus producing a highly polished, damage resistant, laser reflecting surface.

4. The method of claim 3 wherein the abrasive is aluminum oxide with an average particle size of about 0.3 microns.

5. The method of claim 3 wherein the restoring is performed at least twice.

* * * * *